United States Patent
Livescu et al.

(10) Patent No.: US 11,258,352 B2
(45) Date of Patent: Feb. 22, 2022

(54) SYSTEMS AND METHODS FOR FAST RESPONSE AND LOW TOTAL HARMONIC DISTORTION POWER FACTOR CORRECTION

(71) Applicant: Dell Products L.P., Round Rock, TX (US)

(72) Inventors: Constantin Darius Livescu, Austin, TX (US); Mark A. Muccini, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 16/409,516

(22) Filed: May 10, 2019

(65) Prior Publication Data

US 2020/0358349 A1 Nov. 12, 2020

(51) Int. Cl.
- *G06F 1/28* (2006.01)
- *H02M 1/42* (2007.01)
- *H02M 1/12* (2006.01)
- *H02M 1/00* (2006.01)

(52) U.S. Cl.
CPC .......... *H02M 1/4208* (2013.01); *G06F 1/28* (2013.01); *H02M 1/12* (2013.01); *H02M 1/0009* (2021.05)

(58) Field of Classification Search
CPC .... H02M 1/4208; H02M 1/12; H02M 1/0009; G06F 1/28
See application file for complete search history.

(56) References Cited

U.S. PATENT DOCUMENTS

| | | | | |
|---|---|---|---|---|
| 5,986,434 A | * | 11/1999 | Roy | H02J 7/022 320/128 |
| 2013/0194845 A1 | * | 8/2013 | Bianco | H02M 1/4225 363/90 |
| 2014/0241019 A1 | * | 8/2014 | Divan | H02M 7/06 363/84 |
| 2018/0145593 A1 | * | 5/2018 | Xi | G05F 1/24 |
| 2020/0195151 A1 | * | 6/2020 | Chen | H02M 3/337 |
| 2020/0257348 A1 | * | 8/2020 | Wanner | H02H 3/006 |
| 2021/0234471 A1 | * | 7/2021 | Qiu | H02M 1/14 |
| 2021/0296981 A1 | * | 9/2021 | Neudorf | G01R 19/16538 |

* cited by examiner

*Primary Examiner* — Zahid Choudhury
(74) *Attorney, Agent, or Firm* — Jackson Walker L.L.P.

(57) ABSTRACT

A system may include a power train comprising a rectifier and power factor correction stage configured to receive an alternating current (AC) input voltage waveform and convert the AC input voltage waveform into a regulated direct current (DC) voltage on a bulk capacitor configured to store electrical charge and a controller configured to control the rectifier and power factor correction stage to perform power factor correction between the AC input voltage waveform and an AC input current waveform related to the AC input voltage waveform. The controller may implement a voltage regulation loop configured to regulate the regulated DC voltage on the bulk capacitor to a desired constant average value based on a combination of a DC current signal associated with the power train and a voltage loop error signal based on the regulated DC voltage and a current loop regulating the shape of the AC input current waveform to a sinusoidal value in phase with the AC input voltage waveform.

15 Claims, 3 Drawing Sheets

SYSTEMS AND METHODS FOR FAST RESPONSE AND LOW TOTAL HARMONIC DISTORTION POWER FACTOR CORRECTION

TECHNICAL FIELD

The present disclosure relates in general to information handling systems, and more particularly to systems and methods for providing for power factor correction in a power system, wherein such power factor correction has a fast response with low total harmonic distortion.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to convert an alternating-current waveform received at an input to a bulk direct-current waveform, which is in turn converted at the output of the power supply unit to an output direct-current waveform used to power components of the information handling system. Thus, a power supply unit may include a rectifier and/or power factor correction stage configured to receive the input alternating current (AC) source and rectify the input alternating waveform to charge a bulk capacitor to a desired voltage. A direct-current-to-direct-current (DC/DC) stage may convert the voltage on the bulk capacitor to a direct-current output voltage provided to components of the information handling system in order to power such components.

Using traditional approaches, a typical power factor correction (PFC) control circuit may include two control loops: a voltage regulation loop regulating the bulk voltage on the bulk capacitor to a constant average value, and a current loop regulating the shape of the input AC current to a sinusoidal value in phase with the voltage waveforms. In order to maintain the current total harmonic distortion (iTHD) at acceptable values (e.g., limit line current harmonics up to the 40th order), the current loop must have a relatively high bandwidth (e.g., greater than 10 kilohertz). In order to avoid the inherent bulk voltage two times line frequency ripple distorting the AC current, the voltage loop must have a relatively low bandwidth (e.g., less than 20 hertz). The low bandwidth for the voltage loop may have a negative consequence of poor loop voltage response at load transients of the power supply unit. The result may be a power supply unit with a lower efficiency and lower holdup time, because the DC/DC stage must be designed to maintain regulation with a relatively wide variation of bulk voltage.

SUMMARY

In accordance with the teachings of the present disclosure, the disadvantages and problems associated with existing power supply units may be reduced or eliminated.

In accordance with embodiments of the present disclosure, a system may include a power train comprising a rectifier and power factor correction stage configured to receive an alternating current (AC) input voltage waveform and convert the AC input voltage waveform into a regulated direct current (DC) voltage on a bulk capacitor configured to store electrical charge and a controller configured to control the rectifier and power factor correction stage to perform power factor correction between the AC input voltage waveform and an AC input current waveform related to the AC input voltage waveform. The controller may implement a voltage regulation loop configured to regulate the regulated DC voltage on the bulk capacitor to a desired constant average value based on a combination of a DC current signal associated with the power train and a voltage loop error signal based on the regulated DC voltage and a current loop regulating the shape of the AC input current waveform to a sinusoidal value in phase with the AC input voltage waveform.

In accordance with these and other embodiments of the present disclosure, an information handling system may include at least one information handling resource and a power supply unit for supplying electrical energy to the at least one information handling resource, the power supply unit comprising a power train comprising a rectifier and power factor correction stage configured to receive an alternating current (AC) input voltage waveform and convert the AC input voltage waveform into a regulated direct current (DC) voltage on a bulk capacitor configured to store electrical charge and a controller configured to control the rectifier and power factor correction stage to perform power factor correction between the AC input voltage waveform and an AC input current waveform related to the AC input voltage waveform. The controller may implement a voltage regulation loop configured to regulate the regulated DC voltage on the bulk capacitor to a desired constant average value based on a combination of a DC current signal associated with the power train and a voltage loop error signal based on the regulated DC voltage and a current loop regulating the shape of the AC input current waveform to a sinusoidal value in phase with the AC input voltage waveform.

In accordance with these and other embodiments of the present disclosure, a method may be applied in a power train comprising a rectifier and power factor correction stage configured to receive an alternating current (AC) input voltage waveform and convert the AC input voltage waveform into a regulated direct current (DC) voltage on a bulk capacitor configured to store electrical charge. The method may include controlling the rectifier and power factor correction stage to perform power factor correction between the AC input voltage waveform and an AC input current waveform related to the AC input voltage waveform by implementing a voltage regulation loop configured to regulate the regulated DC voltage on the bulk capacitor to a desired constant average value based on a combination of a DC current signal associated with the power train and a voltage loop error signal based on the regulated DC voltage and by further implementing a current loop regulating the shape of the AC input current waveform to a sinusoidal value in phase with the AC input voltage waveform.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
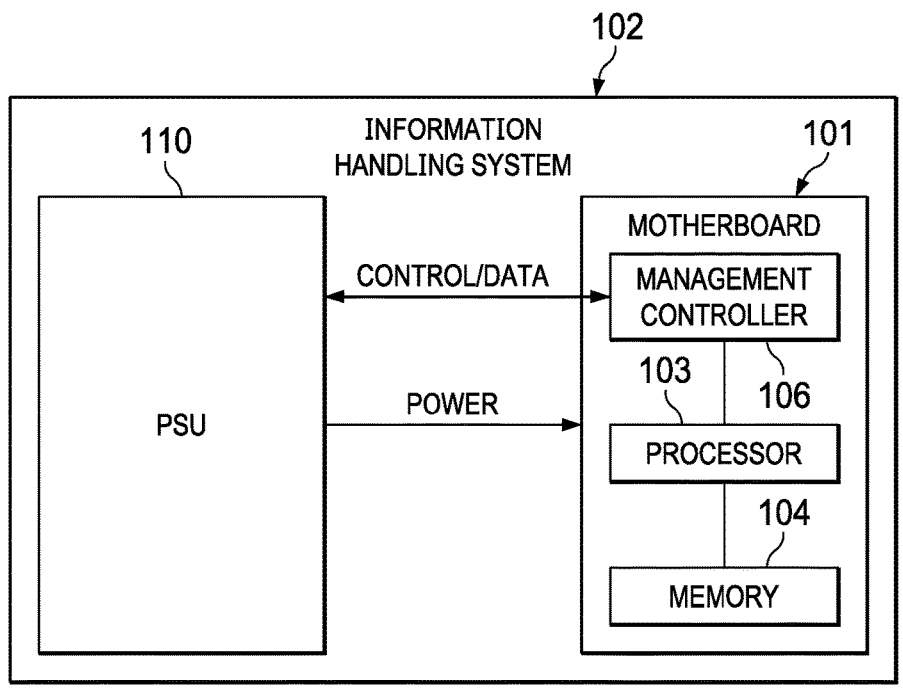
FIG. 1 illustrates a block diagram of selected components of an example information handling system, in accordance with embodiments of the present disclosure.
Figure 2:
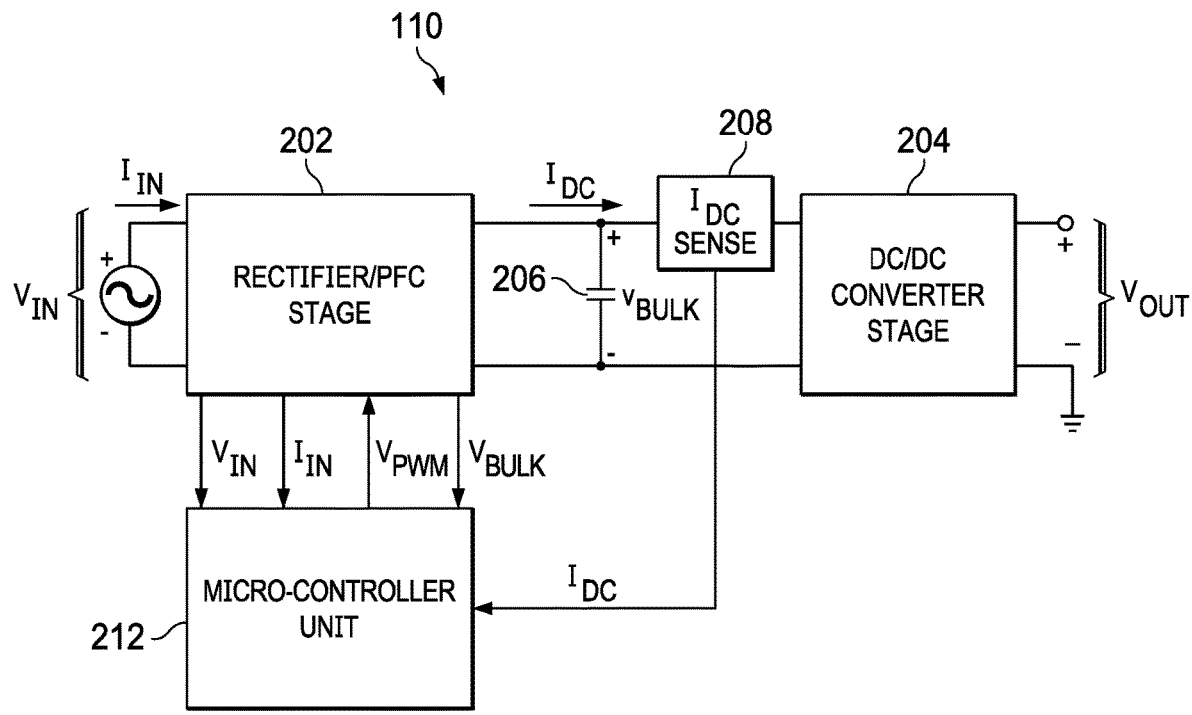
FIG. 2 illustrates a block diagram of selected components of an example power supply unit, in accordance with embodiments of the present disclosure.
Figure 2:
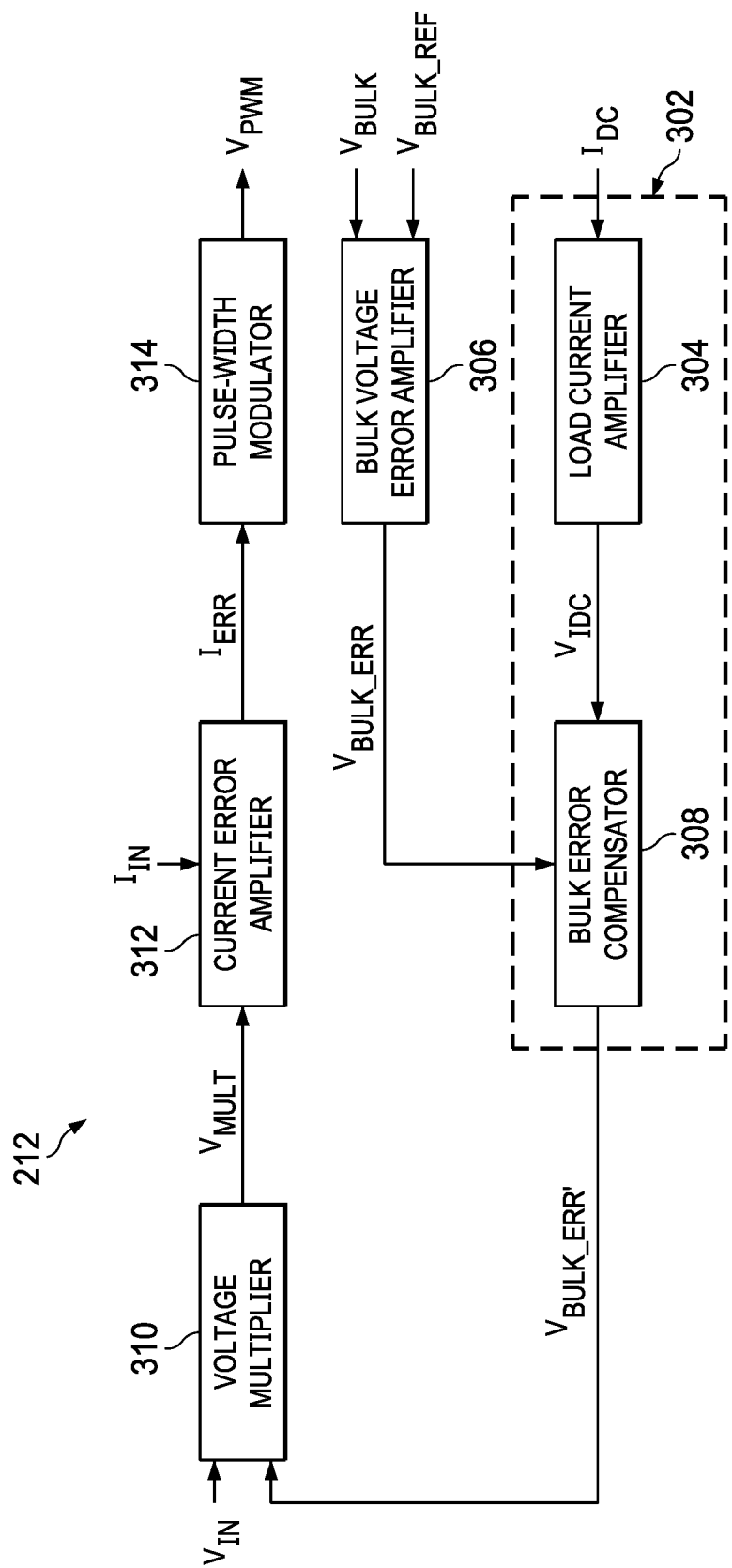
Figure 3:
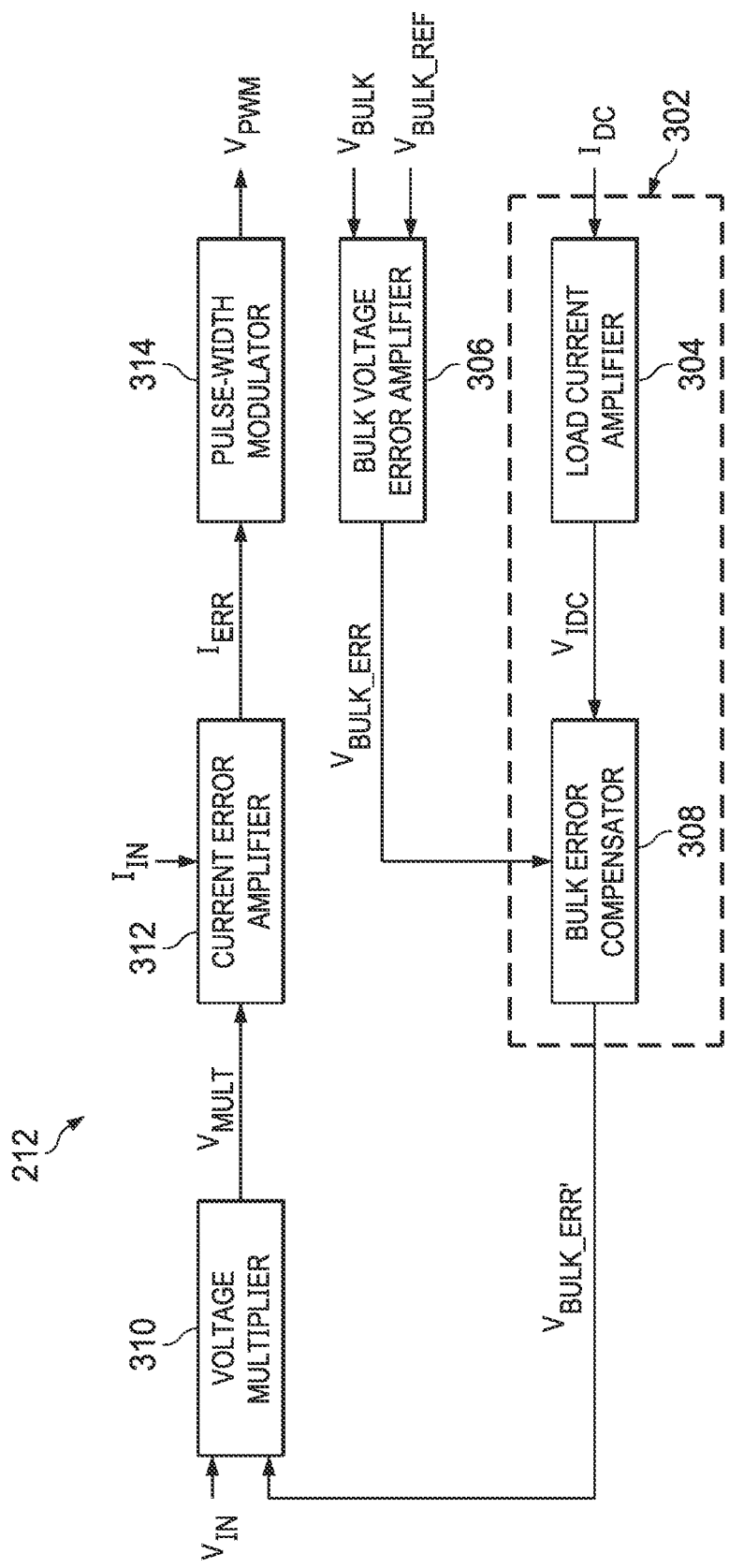
FIG. 3 illustrates a block diagram of selected components of a microcontroller unit of a power supply unit, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of selected components of an example information handling system 102, in accordance with embodiments of the present disclosure. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110 (e.g., via a Power Management Bus). For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. Example implementations of PSU 110 may be represented below by FIGS. 2 and 3 and the descriptions thereof.

In addition to motherboard 101, processor 103, memory 104, management controller 106, and PSU 110, information handling system 102 may include one or more other information handling resources. For example, in some embodiments, information handling system 102 may include more than one PSU 110.

FIG. 2 illustrates a block diagram of selected components of an example PSU 110, in accordance with embodiments of the present disclosure. Example PSU 110 of FIG. 2 may be used in some embodiments to implement PSU 110 depicted in FIG. 1. As shown in FIG. 2, PSU 110 may include a microcontroller unit (MCU) 212 and a power train with multiple converter stages: a rectifier/power factor correcting (PFC) stage 202, a DC/DC converter stage 204, a bulk capacitor 206 coupled between an output of rectifier/PFC stage 202 and the respective inputs of DC/DC converter stage 204, and a current sensor 208 for sensing a DC current $I_{DC}$ delivered from bulk capacitor 206 to DC/DC converter stage 204.

The power train of PSU 110 may be coupled at its outputs to a power bus configured to deliver electrical energy to motherboard 101 and other components of information handling system 102. Such power train may be configured to convert electrical energy received by PSU 110 (e.g., a 120-volt alternating current voltage waveform) into electrical energy usable to information handling resources of information handling system 102 (e.g., 12-volt direct current voltage source). In some embodiments, the power train may comprise a rectifier. In these and other embodiments, the power train may comprise a voltage regulator (e.g., a multiphase voltage regulator). As mentioned above, the power train of PSU 110 may comprise rectifier/power factor correcting (PFC) stage 202, a DC/DC converter stage 204, and a bulk capacitor 206.

Rectifier/PFC stage 202 may be configured to, based on an input current $I_{IN}$, a sinusoidal voltage source $V_{IN}$, and a pulse-width modulated (PWM) control signal $V_{PWM}$, shape the input current $I_{IN}$ to have a sinusoidal waveform in-phase with the source voltage $V_{IN}$ and to generate regulated DC bus voltage $V_{BULK}$ on bulk capacitor 206. In some embodiments, rectifier/PFC stage 202 may be implemented as an AC/DC converter using a boost converter topology, wherein PWM control signal $V_{PWM}$ controls switching of switches of such boost converter in order to generate regulated DC bus voltage $V_{BULK}$ on bulk capacitor 206.

DC/DC converter stage 204 may be configured to convert bulk capacitor voltage $V_{BULK}$ to a DC output voltage $V_{OUT}$ which may be provided to a load (e.g., to motherboard 101 and/or other information handling resources of information handling system 102 in order to power such information handling resources). In some embodiments, DC/DC converter stage 204 may be implemented as a resonant converter which converts a higher DC voltage (e.g., 400 V) into a lower DC voltage (e.g., 12 V).

As mentioned above, PSU 110 may also include current sensor 208. Current sensor 208 may comprise any suitable system, device, or apparatus configured to sense DC current $I_{DC}$ flowing from bulk capacitor 206 to DC/DC converter stage 204. For example, in some embodiments, current sensor 208 may include a resistor with a very low resistance capable of generating a voltage indicative of DC current $I_{DC}$ and an analog-to-digital converter (ADC) configured to convert such measured voltage into a digitally equivalent signal that may be processed by MCU 212.

MCU 212 may comprise a microprocessor, DSP, ASIC, FPGA, EEPROM, or any combination thereof, or any other device, system, or apparatus for controlling operation of PSU 110. As such, MCU 212 may comprise firmware, logic, and/or data for controlling functionality of PSU 110. In some embodiments, an MCU 212 may be communicatively coupled to management controller 106 allowing for communication of data and/or control signals between management controller 106 and MCU 212.

In particular, as described in greater detail below, MCU 212 may be configured to, based on input current $I_{IN}$, sinusoidal voltage source $V_{IN}$, regulated DC bus voltage $V_{BULK}$, and DC current $I_{DC}$, generate PWM control signal $V_{PWM}$ in order to control rectifier/PFC stage 202 (e.g., by controlling switching of switches of a boost converter integral to rectifier/PFC stage 202).

FIG. 3 illustrates a block diagram of selected components of an MCU 212, in accordance with embodiments of the present disclosure. Example MCU 212 of FIG. 3 may be used in some embodiments to implement MCU 212 depicted in FIG. 2. As shown in FIG. 2, MCU 212 may include a current compensation block 302 comprising a load current amplifier 304 and a bulk error compensator 308. MCU 212 may also include a bulk voltage error amplifier 306, a voltage multiplier 310, a current error amplifier 312, and a pulse-width modulator 314.

Load current amplifier 304 may comprise any system, device, or apparatus configured to receive a signal indicative of DC current $I_{DC}$ and apply a gain $K_i$ to load current amplifier 304, thus generating an amplified DC current signal $V_{IDC}$ (e.g., $V_{IDC}=K_iI_{DC}$).

Bulk voltage error amplifier 306 may comprise any system, device, or apparatus configured to receive a signal indicative of regulated DC bus voltage $V_{BULK}$ and generate a regulated DC bus error voltage signal $V_{BULK\_ERR}$ indicative of a difference between regulated DC bus voltage $V_{BULK}$ and a reference voltage $V_{BULK\_REF}$ indicative of a desired voltage for regulated DC bus voltage $V_{BULK}$ (e.g., $V_{BULK\_ERR}=V_{BULK}-V_{BULK\_REF}$). Accordingly, current error amplifier 312 may be part of a voltage control loop based on regulated DC bus voltage $V_{BULK}$, in order to regulate regulated DC bus voltage $V_{BULK}$ to a constant average value.

Bulk error compensator 308 may comprise any system, device, or apparatus configured to receive regulated DC bus error voltage signal $V_{BULK\_ERR}$ and amplified DC current signal $V_{IDC}$ and generate a compensated regulated DC bus error voltage signal $V_{BULK\_ERR}'$ indicative of a difference between regulated DC bus error voltage signal $V_{BULK\_ERR}$ and amplified DC current signal $V_{IDC}$ (e.g., $V_{BULK\_ERR}'=V_{BULK\_ERR}-V_{IDC}$).

Voltage multiplier 310 may comprise any system, device, or apparatus configured to receive compensated regulated DC bus error voltage signal $V_{BULK\_ERR}'$ and a signal indicative of sinusoidal voltage source $V_{IN}$ and generate a multiplied voltage signal $V_{MULT}$ equal to compensated regulated DC bus error voltage signal $V_{BULK\_ERR}'$ multiplied by a ratio of an absolute value of sinusoidal voltage source $V_{IN}$ over a root-mean-square of sinusoidal voltage source $V_{IN}$ squared, further multiplied by a gain $K_v$ (e.g., $V_{MULT}=K_v V_{BULK\_ERR}'|V_{IN}|/\text{rms}(V_{IN}^2)$).

Current error amplifier 312 may comprise any system, device, or apparatus configured to receive multiplied voltage signal $V_{MULT}$ and input current $I_{IN}$ and generate a current error signal $I_{ERR}$ equal to a difference between input current $I_{IN}$ and multiplied voltage signal $V_{MULT}$ (e.g., $I_{ERR}=I_{IN}-V_{MULT}$). Accordingly, current error amplifier 312 may be part of a current control loop based on input current $I_{IN}$, in order to regulate the shape of input current $I_{IN}$ to a sinusoidal value in phase with sinusoidal voltage source $V_{IN}$.

Pulse width modulator 314 may comprise any system, device, or apparatus configured to receive current error signal $I_{ERR}$ and generate PWM control signal $V_{PWM}$ in order to control rectifier/PFC stage 202 to provide power factor correction between input current $I_{IN}$ and sinusoidal voltage source $V_{IN}$ (e.g., $V_{PWM}=KI_{ERR}$, where K is a constant). By using substitution of equations:

$$V_{PWM}=K\{I_{IN}-K_v[(V_{BULK}-V_{BULK\_REF})-K_iI_{DC}]|V_{IN}|/(\text{rms}(V_{IN}^2))\}$$

Notably, without the presence of current compensation block 302 (i.e., if regulated DC bus error voltage signal $V_{BULK\_ERR}$ was an input to voltage multiplier 310 in lieu of compensated regulated DC bus error voltage signal $V_{BULK\_ERR}'$), MCU 212 would have an architecture similar to that of existing approaches for providing PWM control for PFC control stages. With such architecture, PWM control signal $V_{PWM}$ would be given by:

$$V_{PWM}=K\{I_{IN}-K_v(V_{BULK}-V_{BULK\_REF})|V_{IN}|/(\text{rms}(V_{IN}^2))\}$$

Thus, amplified DC current signal $V_{IDC}=K_iI_{DC}$ that is introduced by MCU 212 shown in FIG. 3 adds to a voltage loop error signal (e.g., regulated DC bus error voltage signal $V_{BULK\_ERR}$) a signal (e.g., DC current $I_{DC}$) proportional to an output current of rectifier/PFC stage 202 and/or an output load current of DC/DC converter stage 204. Such additional signal may not distort input current $I_{IN}$ and may provide a fast response to a load transient with potentially negligible variation of bulk voltage $V_{BULK}$. Such architecture may result in a PSU with higher efficiency and significantly higher holdup time capability than that of existing architectures.

Although the foregoing contemplates generation of PWM control signal $V_{PWM}$ using digital control within MCU 212, in some embodiments, some or all of the components of MCU 212 may be implemented in equivalent analog components.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    a power train comprising a rectifier and power factor correction stage configured to receive an alternating current (AC) input voltage waveform and convert the AC input voltage waveform into a regulated direct current (DC) voltage on a bulk capacitor configured to store electrical charge; and
    a controller configured to control the rectifier and power factor correction stage to perform power factor correction between the AC input voltage waveform and an AC input current waveform related to the AC input voltage waveform by implementing:

a voltage regulation loop configured to regulate the regulated DC voltage on the bulk capacitor to a desired constant average value based on a combination of a DC current signal associated with the power train and a voltage loop error signal based on the regulated DC voltage; and a current loop regulating the shape of the AC input current waveform to a sinusoidal value in phase with the AC input voltage waveform.

2. The system of claim 1, wherein the voltage loop error signal is indicative of a difference between the regulated DC voltage and the desired constant average value.

3. The system of claim 1, wherein the DC current signal is proportional to an output current generated by the rectifier and power factor correction stage.

4. The system of claim 1, wherein the power train further comprises a direct current-to-direct current (DC/DC) converter stage configured to convert the regulated DC voltage into a second regulated DC voltage.

5. The system of claim 4, wherein the DC current signal is proportional to an output current generated by the DC/DC converter stage.

6. An information handling system comprising:
at least one information handling resource; and
a power supply unit for supplying electrical energy to the at least one information handling resource, the power supply unit comprising:
  a power train comprising a rectifier and power factor correction stage configured to receive an alternating current (AC) input voltage waveform and convert the AC input voltage waveform into a regulated direct current (DC) voltage on a bulk capacitor configured to store electrical charge; and
  a controller configured to control the rectifier and power factor correction stage to perform power factor correction between the AC input voltage waveform and an AC input current waveform related to the AC input voltage waveform by implementing:
    a voltage regulation loop configured to regulate the regulated DC voltage on the bulk capacitor to a desired constant average value based on a combination of a DC current signal associated with the power train and a voltage loop error signal based on the regulated DC voltage; and
    a current loop regulating the shape of the AC input current waveform to a sinusoidal value in phase with the AC input voltage waveform.

7. The information handling system of claim 6, wherein the voltage loop error signal is indicative of a difference between the regulated DC voltage and the desired constant average value.

8. The information handling system of claim 6, wherein the DC current signal is proportional to an output current generated by the rectifier and power factor correction stage.

9. The information handling system of claim 6, wherein the power train further comprises a direct current-to-direct current (DC/DC) converter stage configured to convert the regulated DC voltage into a second regulated DC voltage.

10. The information handling system of claim 9, wherein the DC current signal is proportional to an output current generated by the DC/DC converter stage.

11. A method comprising, in a power train comprising a rectifier and power factor correction stage configured to receive an alternating current (AC) input voltage waveform and convert the AC input voltage waveform into a regulated direct current (DC) voltage on a bulk capacitor configured to store electrical charge:
controlling the rectifier and power factor correction stage to perform power factor correction between the AC input voltage waveform and an AC input current waveform related to the AC input voltage waveform by implementing:
  a voltage regulation loop configured to regulate the regulated DC voltage on the bulk capacitor to a desired constant average value based on a combination of a DC current signal associated with the power train and a voltage loop error signal based on the regulated DC voltage; and
  a current loop regulating the shape of the AC input current waveform to a sinusoidal value in phase with the AC input voltage waveform.

12. The method of claim 11, wherein the voltage loop error signal is indicative of a difference between the regulated DC voltage and the desired constant average value.

13. The method of claim 11, wherein the DC current signal is proportional to an output current generated by the rectifier and power factor correction stage.

14. The method of claim 11, wherein the power train further comprises a direct current-to-direct current (DC/DC) converter stage configured to convert the regulated DC voltage into a second regulated DC voltage.

15. The method of claim 14, wherein the DC current signal is proportional to an output current generated by the DC/DC converter stage.

* * * * *